(12) United States Patent
Theurich et al.

(10) Patent No.: US 9,550,563 B2
(45) Date of Patent: *Jan. 24, 2017

(54) WING TIP SHAPE FOR A WING, IN PARTICULAR OF AIRCRAFT

(71) Applicants: Airbus Operations GmbH, Hamburg (DE); Deutsches Zentrum für Luft- und Raumfahrt e.V. (DLR), Köln (DE)

(72) Inventors: Frank Theurich, Hude (DE); Jan Himisch, Braunschweig (DE)

(73) Assignee: Airbus Operations GmbH (DE)

(*) Notice: Subject to any disclaimer, the term of this patent is extended or adjusted under 35 U.S.C. 154(b) by 100 days.

This patent is subject to a terminal disclaimer.

(21) Appl. No.: 14/252,173

(22) Filed: Apr. 14, 2014

(65) Prior Publication Data

US 2014/0312174 A1    Oct. 23, 2014

Related U.S. Application Data

(63) Continuation of application No. 12/515,825, filed as application No. PCT/EP2007/010096 on Nov. 21, 2007, now Pat. No. 8,727,285.
(Continued)

(30) Foreign Application Priority Data

Nov. 21, 2006  (DE) .................. 10 2006 055 090

(51) Int. Cl.
*B64C 23/06*  (2006.01)

(52) U.S. Cl.
CPC ............ *B64C 23/065* (2013.01); *Y02T 50/164* (2013.01)

(58) Field of Classification Search
CPC .. B64C 23/065; B64C 3/14; B64C 2700/6295; Y02T 50/164
(Continued)

(56) References Cited

U.S. PATENT DOCUMENTS

| | | | |
|---|---|---|---|
| 4,245,804 A | 1/1981 | Ishimitsu et al. | |
| 5,102,068 A | 4/1992 | Gratzer | |

(Continued)

FOREIGN PATENT DOCUMENTS

| | | |
|---|---|---|
| DE | 10117721 A1 | 10/2002 |
| JP | 02293298 A | 12/1990 |

(Continued)

OTHER PUBLICATIONS

Japanese Office Action dated May 20, 2014.
(Continued)

*Primary Examiner* — Valentina Xavier
(74) *Attorney, Agent, or Firm* — Lerner, David, Littenberg, Krumholz & Mentlik, LLP

(57) ABSTRACT

A wing for of aircraft has a wing tip shape that has a profile that extends in the direction of the span of the wing, and across the direction of the span of the wing extends from the wing leading edge to the wing trailing edge. The profile is delimited by a first skin and a second skin, with a winglet, arranged on the wing end. The winglet is substantially planar, and has a transition region arranged between the wing and the winglet, that extends from a connection on the wing to a connection on the winglet. The curvature of the local dihedral can increase in the transition region from a low level or a level of zero at or near the wing intersection in the outboard direction.

18 Claims, 3 Drawing Sheets

Related U.S. Application Data

(60) Provisional application No. 60/872,704, filed on Dec. 4, 2006.

(58) Field of Classification Search
USPC ......... 244/35 R, 91, 199.1, 199.4, 45 R, 201
See application file for complete search history.

(56) References Cited

U.S. PATENT DOCUMENTS

| | | |
|---|---|---|
| 5,348,253 A | 9/1994 | Gratzer |
| 5,407,153 A | 4/1995 | Kirk et al. |
| 6,484,968 B2 | 11/2002 | Felker |
| 6,578,798 B1 | 6/2003 | Dizdarevic et al. |
| 6,722,615 B2 | 4/2004 | Heller et al. |
| 6,886,778 B2 * | 5/2005 | McLean ............... B64C 3/10 244/45 R |
| 7,275,722 B2 | 10/2007 | Irving et al. |
| 7,644,892 B1 | 1/2010 | Alford, Jr. et al. |
| 8,128,035 B2 | 3/2012 | Malachowski et al. |
| 8,382,041 B1 | 2/2013 | Yechout |
| 2002/0162917 A1 | 11/2002 | Heller et al. |
| 2006/0216153 A1 * | 9/2006 | Wobben ............... 416/241 A |
| 2012/0275925 A1 | 11/2012 | Koegler et al. |

FOREIGN PATENT DOCUMENTS

| | | |
|---|---|---|
| UZ | 02570 C | 2/2005 |
| WO | 0247979 A | 6/2002 |

OTHER PUBLICATIONS

Ansorage et al., "Mathematics for Engineers", ISBN 3-05-501618-1, 1;1-4 (1994).

Yu. Ya. Kaazik, Mathematical Dictionary, M. Physmatlit, 2007, p. 78 and p. 122.

International Search Report PCT/EP2007/01009 (Mar. 12, 2008).

* cited by examiner

US 9,550,563 B2

WING TIP SHAPE FOR A WING, IN PARTICULAR OF AIRCRAFT

CROSS-REFERENCE TO RELATED APPLICATIONS

The present application is a continuation, of U.S. patent application Ser. No. 12/515,825, filed on May 21, 2009, which application is a national phase entry under 35 U.S.C. §371 of International Application No. PCT/EP2007/010096 filed Nov. 21, 2007, which claims priority from German Patent Application No. 10 2006 055 090.0 filed Nov. 21, 2006 and of U.S. Provisional Patent Application No. 60/872,704 filed Dec. 4, 2006, all of which are hereby incorporated herein by reference.

FIELD OF INVENTION

The invention relates to a wing tip shape for a wing, in particular of aircraft.

BACKGROUND OF THE INVENTION

Wing tip shapes, in particular for wings of aircraft, have been known for a long time and have already been examined in detail. The design of wing tip shapes is of essential importance in the development of present-day commercial aircraft and transport aircraft, which are operated at high transonic speeds (Mach 0.65 to Mach 0.95). The total drag of an aircraft wing operating in the transonic range is essentially comprised of wave drag, profile drag, induced drag and parasitic drag. The induced drag in turn essentially depends on the lift distribution on the wing, and on the wingspan. Therefore a reduction in the induced drag is most easily obtained by an increase in the wingspan. However, due to structural, industrial and operational constraints this is not possible to an unlimited extent.

One option for reducing the induced drag at a constant wingspan consists of the replacement of the planar tip shape of a wing with a non-planar shape.

A possible non-planar tip shape is a winglet, which is provided on the wing tip. Main geometrical parameters are the height, the taper ratio and the dihedral angle. The dihedral angle of the winglet can differ significantly from the dihedral angle of the wing and is typically constant or almost constant over the winglet span. If the dihedral angle of the winglet is constant or almost constant the winglet is denoted as planar or almost planar.

Generally speaking it has been shown that vertical winglets with an almost perpendicular transition between the wing and the winglet provide the most effective option for reducing the induced drag. However, the region of the transition from the wing to the winglet poses a problem, as in this region, due to interference effects in transonic flight, undesirable shock waves easily occur. The shock waves on the wing, which are a common and fundamental aspect of transonic aircraft operation, have a negative effect on the region of transition from the wing to the winglet, and in turn lead to an increase in the wave drag. Therefore, overall, the potential provided by vertical winglets cannot be fully utilised.

From U.S. Pat. No. 5,348,253, a wing tip shape for a wing of an aircraft is known, on which wing a winglet, provided on the wing tip, which winglet is essentially planar, is arranged at a transition region which extends from a connection on the wing to a connection on the winglet. The transition region, in which the local dihedral shape from the wing to the winglet makes a continuous transition, is in the shape of a circular arc with a radius of curvature that lies within narrow limits, which shape is determined by the height of the winglet, by said winglet's angle of inclination in relation to the wing span (cant angle), and by a constant parameter of curvature. This known wing tip shape is suitable for significantly reducing the induced drag; however, due to interference effects in the region of the circular-arc shaped transition from the wing to the almost planar winglet there is a tendency towards an undesired level of wave drag.

Furthermore, from DE 101 17 721 A1 or B4, corresponding to US 2002/0162917 A1 or U.S. Pat. No. 6,722,615 B2, a wing tip extension for an aircraft wing is known, which wing tip extension between a connection region for connection with the wing and the tip of the wing tip extension provides a continuous increase in the local dihedral, combined with a continuous increase in the sweep of both the leading edge and the trailing edge and a continuous decrease in the depth of the wing tip extension. As far as the angle of the local dihedral is concerned, it is stated that said angle is to increase from 0° to 10° in the connection region to the wing up to 45° to 60° at the tip of the wing tip extension. This known design of the wing tip extension results in a low level of interference and consequently low level of wave drag. However, the height that can be attained with this wing tip shape is limited, and there is little discretion in the selection of the design of the wing tip region if compared to the design of an added winglet.

Finally, from U.S. Pat. No. 6,484,968 B2 an aircraft is known with winglets provided on the ends of the wing, wherein the winglets follow an elliptical curve. The proposal of U.S. Pat. No. 6,484,968 B2 again defines a connection in which the curvature of the wing tip shape in the connection region to the wing is at its maximum and then along the wing span decreases, which is exactly contrary to the requirements defined later on, so that with this wing tip shape, too, undesired interference effects lead to an increase in the wave drag.

BRIEF SUMMARY OF THE INVENTION

It is the object of the invention to provide a wing tip shape that on the one hand to the fullest extent possible makes use of the advantage provided by high winglets in relation to a reduction in the induced drag, while on the other hand reducing interference effects in the transition region from the wing to the winglet to a minimum.

This object is met by a wing tip shape with the features of claim 1.

Advantageous embodiments and improvements of the wing tip shape according to the invention are provided in the dependent claims.

The invention provides a wing tip shape for a wing, in particular of aircraft, which wing comprises a profile that extends in the direction of the span of the wing and across said direction of the span of the wing extends from the wing leading edge to the wing trailing edge, which profile is delimited by a first skin and a second skin, with a winglet, arranged on the wing end, which winglet is essentially planar, and with a transition region arranged between the wing and the winglet, which transition region extends from a connection on the wing to a connection on the winglet, wherein in the transition region the local dihedral from the wing to the winglet makes a continuous transition. The invention provides for the curvature of the local dihedral in the transition region an increase from a low level or a level of zero near the connection of the transition region to the wing up to a maximum near by the connection of the winglet to the transition region in the outboard direction.

This curvature characteristic may be present at at least one curve formed by constant chordwise points in the transition region along the spanwise dimension, which could be as an example the Leading Edge. Further examples are the trailing edge or a curve formed by points at 50% chord. This depends on the requirements for the specific wing tip shape design to achieve a good surface quality. That is, in terms of the surface formed by the transition region, at least part of the transition region, when viewed in cross-section, presents a curve which has an increasing curvature of local dihedral in the outboard direction.

Investigations relating to the dependence of the interference effects on the geometry and the boundary conditions of flow, on which investigations the invention is based, have shown that the interference effects described in the introduction, which interference effects occur in the region of the transition from the wing to the winglet in the transonic region, significantly depend on the curvature along the wing span. This dependence shows that the curvature in the region of a high profile load, i.e. a large ratio of local lift to local profile depth, has to be as small as possible, and can also increase as the profile load decreases. In order to minimise the induced drag it is advantageous if less aerodynamic load has to be generated on the winglet than on the wing. For this reason a wing tip shape that is to attain a certain height (above the wing) should start with the least possible curvature, which then can increase the steeper the wing tip shape becomes, and the further distant said wing tip shape is from the wing plane.

Using the example of an ellipse, it can be derived that the demand for a small curvature in the connection region of the wing and subsequently continuously increasing curvature constraints the height to be achieved with such a defined wing tip shape. FIG. 4) illustrates this fact, where a section of an ellipse, standardised to a maximum width of 1 for various ratios of large axis a to small axis b is shown, i.e. a/b=1 (circle), a/b=1.2, and a/b=1.5. This justifies the demand for a large planar winglet (advantageously at least 50% of the total height of the wing tip shape) following a transitional arc arrived at taking into account the findings obtained, so as to be able to ensure a high reduction in the induced drag.

To provide a smooth connection between the transition region and the winglet it can be beneficial to have in this area a local reduction in curvature. As the benefits of the invention are maintained it is possible to provide a transition region in which the curvature of the local dihedral increases from a low level or a level of zero near the wing connection over between 50% and 90% of the spanwise dimension of the transition region, up to a maximum.

Preferably, in the transition region the curvature of the local dihedral begins to increase at the wing-side connection of the transition region.

It can be provided for the wing tip shape to extend at maximum over a region of 5 to 20% of the semispan of the wing.

An advantageous embodiment of the invention provides for the wing tip shape to extend at maximum over a region of 10% of the semispan of the wing.

An advantageous embodiment of the invention provides for the planar winglet to extend over at least 50% of the total height of the wing tip shape above the wing. Such dimensioning of the planar winglet, combined with a low curvature of the local dihedral in the connection region of the wing and then an increasing spanwise curvature of the local dihedral in the transition region according to the principles of the invention, ensures a large reduction in the induced drag in combination with small interference effects and low wave drag.

An advantageous embodiment of the invention provides for the planar winglet to be inclined up to 45 degrees in relation to the vertical x-z plane.

The invention can provide for the planar winglet to be inclined up to 60 degrees in relation to the vertical x-z-plane.

The invention can provide for the planar winglet to be inclined up to 80 degrees in relation to the vertical x-z-plane.

The winglet inclination to the vertical plane may also be termed 'cant angle' as it is commonly known in the art.

There can be continuity of the tangent line of the local dihedral at the connection between the wing and the transition region.

There can be continuity of the tangent line of the local dihedral at the connection between the transition region and the winglet.

The leading edge of the transition region at the connection can make a transition, at a continuous tangent line, to the leading edge of the wing.

An advantageous embodiment of the invention provides for the sweep on the leading edge of the wing tip shape to continuously increase up to a point of largest sweep.

From the point of largest sweep, if this point is in the transition region, the leading edge of the transition region can make a transition at a continuous tangent line to the leading edge of the essentially planar winglet.

An advantageous embodiment of the invention provides for the point of largest sweep on the leading edge to be at more than 75% of the spanwise length, calculated from the connection on the wing to the connection on the winglet, of the transition region.

According to an advantageous embodiment of the invention there is continuity of the tangent line of the leading edge over the entire transition region.

BRIEF DESCRIPTION OF THE DRAWINGS

Below, an exemplary embodiment of the wing tip shape according to the invention is explained with reference to the drawing.

The following are shown.

DETAILED DESCRIPTION

Figure 1:
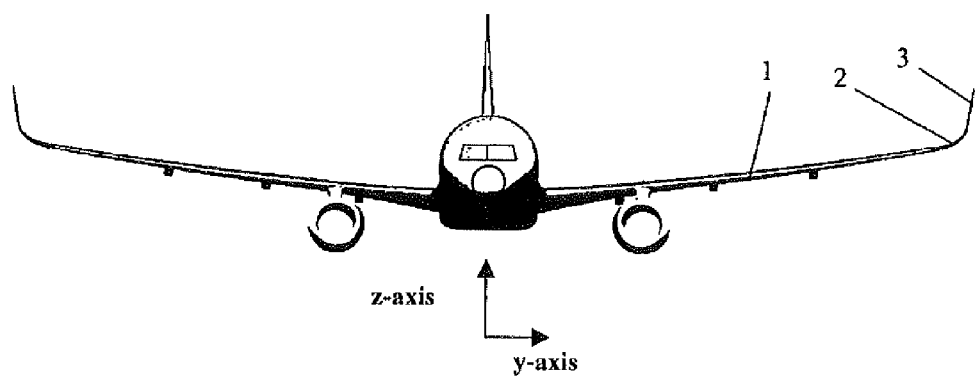
FIG. 1) a front view of a modern commercial aeroplane with a wing tip shape according to an exemplary embodiment of the invention.
Figure 2:
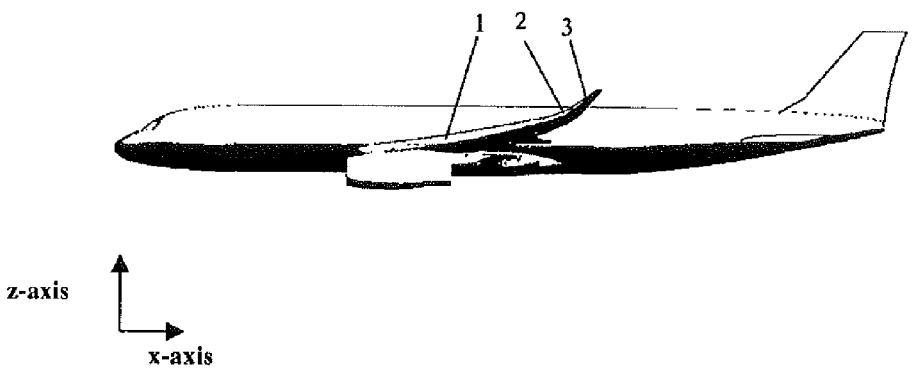
FIG. 2) a lateral view of the commercial aeroplane shown in FIG. 1), with the wing tip shape according to the exemplary embodiment of the invention.

FIGS. 1) and 2) show a commercial aeroplane on whose wing (1) a wing tip shape is provided that is formed by a winglet (3) and a transition region (2).

Figure 3:
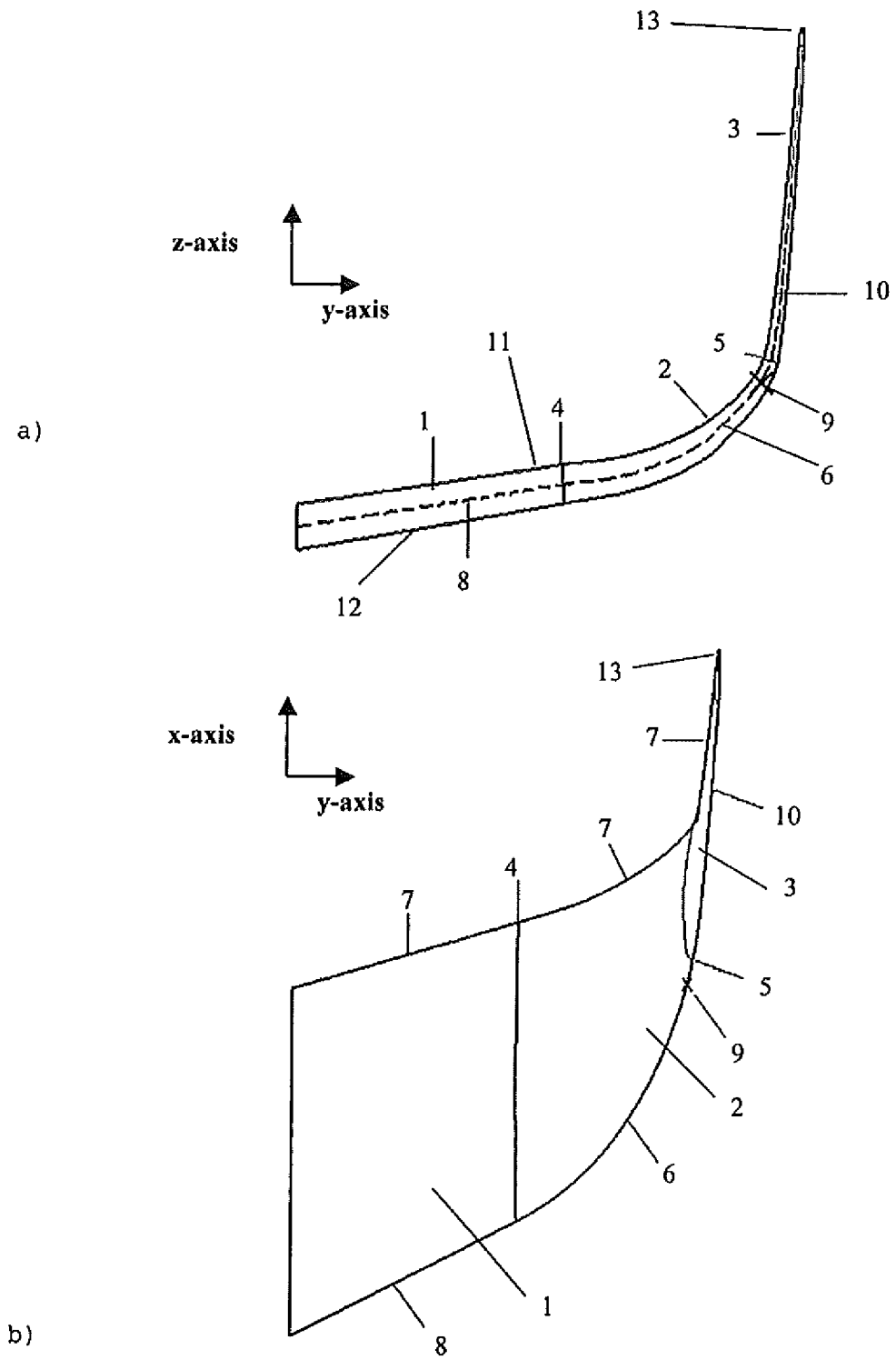
FIG. 3a) an enlarged front view of the wing tip shape according to the exemplary embodiment of the invention.
FIG. 3b) a top view of the wing tip shape of FIG. 3a).
Figure 4:
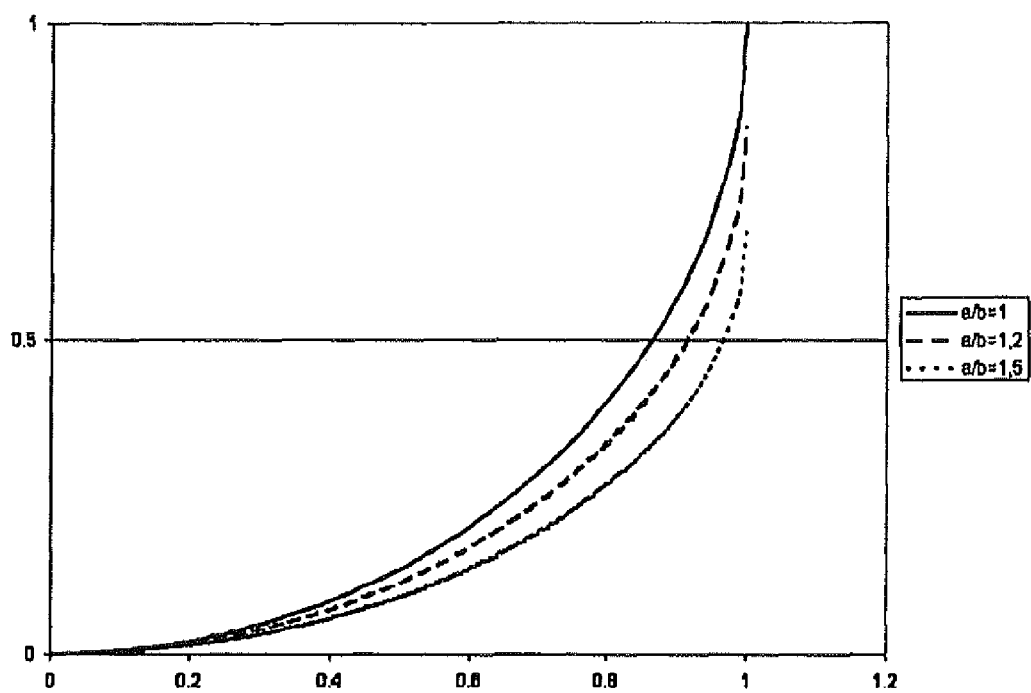
FIG. 4 illustrates relationship between a demand for a small curvature in the connection region of the wing and subsequently increasing curvature constraining the height achieved with such a defined wing tip shape.

FIGS. 3a) and 3b) show in detail views of the exemplary embodiment, the wing (1) comprises a profile which is delimited by a first skin (11), the upper skin, and a second skin (12), the lower skin, and which extends in the direction of the wing span and across it from a wing leading edge (8) to a wing trailing edge (7).

On the wing end the winglet (3) is provided, which is connected to the wing (1) by the transition region (2). The transition region (2) extends from an imaginary or actual connection (4) on the wing (1) to an imaginary or actual connection (5) on the winglet (3). In the transition region (2) the local dihedral, i.e. the angle in relation to the y-axis extending in the direction of the wing span from the wing (1) to the winglet (3) makes a continuous transition. In the transition region (2), in other words from the connection position (4) on the wing side towards the connection position (5), the curvature increases from a low level or a level of zero in the outboard direction.

The spanwise dimension of the transition region is the linear dimension of the transition region measured in the direction perpendicular to the longitudinal axis of the aircraft.

The local dihedral from the wing (1) to the winglet (3) makes a continuous transition, and in the transition region (2) the curvature of the local dihedral increases over at least substantially 50% of the spanwise dimension of the transition region up to a maximum and at most 100% up to the winglet-side connection position (5). In the embodiment shown in FIG. 3a) the curvature of the local dihedral begins to increase at the wing-side connection (4) of the transition region (2) and increases over at least substantially 90% of the spanwise dimension of the transition region (2) in the outboard direction up to a maximum level.

The transition region connects at the connection (4) to the wing (1), while the winglet (3) itself connects at the connection (5) to the transition region (2). As has already been explained, the transition region (2) is characterised by an increase in the curvature of the local dihedral up to a maximum level.

The winglet (3) comprises a planar or almost or essentially planar shape, i.e. it has an essentially constant dihedral from the connection position (5) to its tip (13). Thus in the front view of FIG. 3a) the winglet (3) has an essentially constant inclination towards the y-axis. The geometric parameters of the winglet (3) can essentially be freely defined so that it serves to optimally reduce the induced drag. On the other hand the transition region (2) is optimised to the effect that interference effects and thus the wave drag in this region are reduced to a minimum.

In the exemplary embodiment shown the wing tip shape extends at maximum over a region of 20% of the semispan of the wing (1), the planar winglet (3) extends over at least 50% of the overall height of the wing tip shape above the wing (1) and is inclined up to 45 degrees in relation to the vertical x-z plane, i.e. the aircraft middle plane.

At the connection (4) between the wing (1) and the transition region (2), there can be continuity of the tangent line of the dihedral, i.e. at the connection (4) the tangent at the transition region (2) makes a continuous transition to the tangent at the wing (1), with this being advantageous but not mandatory. Likewise, at the connection (5) between the transition region (2) and the winglet (3) there can be continuity of the tangent line of the dihedral, with this being advantageous but also not mandatory. In the exemplary embodiment of the wing tip shape according to the invention, which wing tip shape is shown in frontal view in FIG. 3a), there is continuity of the tangent line of the dihedral shape in the y-z plane both at the wing-side connection (4) and at the winglet-side connection (5) of the transition region (2).

The top view, shown in FIG. 3b), of the exemplary embodiment of the wing tip shape according to the invention in the x-y plane further shows a continuous-tangent-line connection of the leading edge (6) of the transition region (2) to the leading edge (8) of the wing (1) on the section point or connection point (4), which is again advantageous in having a beneficial effect on the airflow around the leading edge, but which is not mandatory. I.e. at the connection location (4) the tangent of the leading edge (6) of the transition region (2) can make a continuous transition to the tangent of the leading edge (8) of the wing (1), which is again not mandatory.

The leading edge (6) of the transition (2) increases in curvature, thus continuously increasing the sweep up to a point (9) on the leading edge (6) of the transition region (2) or on the leading edge (10) of the winglet (3). Advantageously, this point (9) of largest sweep is at over 75% of the spanwise length, which is calculated from the wing-side connection location (4) (0%) to the winglet-side connection location (5) (100%), or on the leading edge (10) of winglet (3).

Starting at the point (9) of largest sweep, a continuous-tangent-line transition from the leading edge (6) of the transition region (2) to the leading edge (10) of the almost planar winglet (3) is advantageous, if point (9) is on the leading edge (6) of the transition region (2), but also not mandatory.

In the exemplary embodiment shown, there is continuity of the tangent line of the leading edge (6) over the entire transition region (2), which provides a significant advantage but which is not mandatory.

The design of the trailing edge (7) of the transition region (2) can essentially be freely selected, provided the aerodynamic characteristics of the wing tip shape are not negatively affected by it.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE CHARACTERS

1 Wing
2 Transition region
3 Winglet
4 Connection transition region to wing
5 Connection winglet to transition region
6 Leading edge of the transition region
7 Trailing edge
8 Leading edge of the wing
9 Point of largest sweep
10 Leading edge of the winglet
11 Upper skin
12 Lower skin
13 Winglet tip

The invention claimed is:

1. A wing tip device for a wing of an aircraft, wherein the wing tip device comprises:
 a substantially planar winglet;

a transition region connected to the substantially planar winglet;

wherein the wing tip device is configured to be mounted on an end of the wing, wherein the end of the wing comprises a profile that is delimited by a first skin and a second skin, wherein the transition region extends from a first connection on the wing to a second connection on the substantially planar winglet, wherein geometric parameters of the substantially planar winglet are configured to reduce induced drag, and wherein the transition region has a non-constant curvature distribution of the local dihedral to reduce interference effects.

2. The wing tip device of claim 1, wherein in the transition region the radius of curvature of the local dihedral decreases over at least substantially 50% of a spanwise dimension of the transition region in the outboard direction up to a maximum.

3. The wing tip device of claim 1, wherein in the transition region the radius of curvature of the local dihedral decreases over at least substantially 75% of a spanwise dimension of the transition region in the outboard direction up to a maximum.

4. The wing tip device of claim 1, wherein in the transition region the radius of curvature of the local dihedral decreases over at least substantially 90% of a spanwise dimension of the transition region in the outboard direction up to a maximum.

5. The wing tip device of claim 2, wherein in the transition region the radius of curvature of the local dihedral begins to decrease at the first connection of the transition region.

6. The wing tip device of claim 1, wherein the wing tip shape extends at maximum over a region of 5 to 20% of a semispan of the wing.

7. The wing tip device of claim 1, wherein the wing tip extends at maximum over a region of 10% of a semispan of the wing.

8. The wing tip device of claim 1, wherein the substantially planar winglet extends over at least 50% of the total height of the wing above the wing.

9. The wing tip device of claim 1, wherein the substantially planar winglet has a cant angle of up to 45 degrees.

10. The wing tip device of claim 1, wherein the substantially planar winglet has a cant angle of up to 60 degrees.

11. The wing tip device of claim 1, wherein the substantially planar winglet has a cant angle of up to 80 degrees.

12. The wing tip device of claim 1, wherein the tangent line of the local dihedral is continuous at the first connection of the transition region.

13. The wing tip device of claim 1, wherein the tangent line of the local dihedral is continuous at the second connection of the transition region.

14. The wing tip device of claim 1, wherein, at the first connection, a leading edge of the transition region transits at a continuous tangent line to a leading edge of the wing.

15. The wing tip device of claim 1, wherein at least one of the sweep on the leading edge of the transition region and a sweep on a leading edge of the substantially planar winglet continuously increases in the outboard direction up to a point of largest sweep.

16. The wing tip device of claim 15, wherein the leading edge of the transition region transits at a continuous tangent line from the point of largest sweep to a leading edge of the substantially planar winglet.

17. The wing tip device of claim 15, wherein the point of largest sweep on the leading edge of the transition region is at more than 75% of the unrolled length of the transition region, calculated from the first connection to the second connection.

18. The wing tip device of claim 1, wherein a tangent line of the leading edge is continous over the entire transition region.

* * * * *